(12) United States Patent
Kohri et al.

(10) Patent No.: US 7,374,452 B2
(45) Date of Patent: May 20, 2008

(54) BATTERY ACCOMMODATING STRUCTURE AND MOBILE TERMINAL

(75) Inventors: Katsushige Kohri, Hyogo (JP); Yoshiya Matsumoto, Kawasaki (JP); Kouji Hirata, Hyogo (JP); Yoshito Fukata, Hyogo (JP)

(73) Assignees: Fujitsu Limited, Kawasaki (JP); NTT DoCoMo, Inc., Tokyo (JP)

( * ) Notice: Subject to any disclaimer, the term of this patent is extended or adjusted under 35 U.S.C. 154(b) by 910 days.

(21) Appl. No.: 10/856,815

(22) Filed: Jun. 1, 2004

(65) Prior Publication Data

US 2004/0253508 A1    Dec. 16, 2004

(30) Foreign Application Priority Data

Jun. 13, 2003    (JP) .............................. 2003-169332

(51) Int. Cl.
*H01R 3/00*    (2006.01)
(52) U.S. Cl. ...................................... 439/500
(58) Field of Classification Search ................ 439/500, 439/627; 429/181, 163, 100, 175, 96; 174/50, 174/66
See application file for complete search history.

(56) References Cited

U.S. PATENT DOCUMENTS 5,127,849 A * 7/1992 Karl et al. .................. 439/500

FOREIGN PATENT DOCUMENTS

| JP | 8-33026 | 2/1996 |
| JP | 2000-036858 | * 2/2000 |
| JP | 2002-009912 | * 11/2002 |

* cited by examiner

*Primary Examiner*—Alexander Gilman
(74) *Attorney, Agent, or Firm*—Kratz, Quintos & Hanson, LLP

(57) ABSTRACT

In a battery accommodating structure that has a battery chamber defined by a bottom plate and side walls and is provided with a battery rubber receiving a lower end edge of a battery inserted in the battery chamber, the bottom plate has an opening at a portion opposed to the battery rubber, and a battery rubber deviation preventing member that enters in the opening of the bottom plate at least partially to prevent the battery rubber from deviating toward the opening of the bottom plate is provided.

4 Claims, 9 Drawing Sheets

BATTERY ACCOMMODATING STRUCTURE AND MOBILE TERMINAL

BACKGROUND OF THE INVENTION

1. Field of the Invention

The present invention relates to a battery accommodating structure in a device or equipment having a battery chamber in which a battery is accommodated and a mobile terminal that performs communication with an external device or equipment by power supplied from a battery accommodated in a battery chamber.

2. Description of the Related Art

Conventionally, a mobile terminal such as, for example, a mobile phone, or each of devices used over various fields is constituted so as to operate due to power from a battery inserted in a battery chamber thereof.

In such a device, for holding a battery inserted in a battery chamber within a battery chamber stably, it has been known a battery accommodating structure in which a battery in a battery chamber is prevented from chattering by biasing the battery toward one side thereof by a resilient member or the like (for example, refer to Japanese Patent No. 08-33026A (JP)). As one example, a battery accommodating structure disclosed in JP08-33026A is a structure that accommodates a battery in a recessed battery chamber to cover the battery chamber with a battery lid, in which a resilient arm that presses the battery toward the battery lid is provided on a bottom portion of the recessed battery chamber, so that a battery disposed in the battery chamber is prevented from chattering in a direction connecting the battery chamber bottom portion and the battery lid.

Further, a battery accommodating structure that prevents a battery from chattering in a direction extending along a battery chamber bottom face has been considered.

FIG. 1 is a view showing one example of a battery accommodating structure in a mobile phone, and FIG. 2 is an enlarged view of a portion of the battery accommodating chamber indicated with a circle R in FIG. 1.

In FIG. 1, a sectional view of one portion of the mobile phone is shown, in which a mold product 10 constituting a portion of a casing of the mobile phone is attached with a circuit board 20 mounted with various circuit parts. The mold product 10 is provided with a battery chamber 11. The battery chamber 11 has an opening on the left side in FIG. 1, and it is defined by a bottom plate 111 and side walls 112 surrounding the bottom plate 111. A battery 30 is accommodated in the battery chamber 11. The bottom plate 111 and the side walls 112 are molded integrally as the mold product 10. The battery chamber 11 in which the battery 30 is accommodated is covered with a battery lid (not shown). A battery rubber 12 is fixed to a lower end side wall 112a of the side walls 112 defining the battery chamber 11 by an adhesive double coated tape (not shown), a lower end edge 31 of the battery 30 rides on the battery rubber 12 to be urged upwardly by an elastic force thereof, so that chattering is prevented from occurring in a direction along the bottom plate 111 of the battery chamber 11 and electrical connection between a battery and a mobile phone main body is ensured reliably.

In procedure of fitting the battery 30 into the battery chamber 11, only a lower portion of the battery 30 is first inserted into the battery chamber 11 and the lower end edge 31 of the battery 30 is pressed on to the battery rubber 12. In such a state, the battery 30 is next pivoted toward the bottom plate 111 of the battery chamber 11 about a lower end edge of the battery 30 pressed on the battery rubber 12. Thereby, the battery 30 is inserted into the battery chamber 11 with the battery rubber 12 compressed.

As shown in FIG. 2, an opening 111a is formed at a portion of the battery chamber bottom plate 111 opposed to the battery rubber 12, and a rib 112b covering a face 12a of the battery rubber 12 positioned on the side of the battery chamber opening is formed on the lower end side wall 112a of the battery chamber 11 on the side of a battery chamber inlet of the battery rubber 12 (a position where the battery rubber 12 is positioned between the opening 111a of the bottom plate 111 and the same).

In order to manufacture the mold product, a split mold which is split in left and right directions in FIG. 1 and FIG. 2 is used, and the opening 111a is necessarily formed in the bottom plate 112a because the rib 112b must be formed using the split mold which is split to the right side in FIG. 1 and FIG. 2.

Now, when the battery 30 is taken out of the battery chamber 11 shown in FIG. 1, an operation reversed to the operation performed when the battery 30 is inserted into the battery chamber 11 is performed. That is, as shown in FIG. 2, an upper side of the battery 30 is pivoted in a direction of arrow X about the lower end edge 31 pressed on the battery rubber 12 in a state that the lower end edge 31 of the battery 30 pressed on the battery rubber 12 and the lower end edge of the battery 30 is taken out of the battery chamber.

When the battery 30 is pivoted in the direction of arrow X, the battery rubber 12 receives a force acting in a direction of arrow Y so that the battery rubber 12 may eventually be deviated in the direction of arrow Y. In such a state that the battery rubber 12 has been deviated from its regular position, when a battery 30 is next inserted in the battery chamber 11, a biasing force pushing up the battery 30 along the bottom plate 111 does not act on the battery 30, which may result in chattering of the battery within the battery chamber or electrical contact failure between the battery and the mobile phone.

In order to prevent such a drawback from occurring, it is considered to change a mold for manufacturing a mold product.

FIG. 3 is a view showing a portion corresponding to the inside of the circle R in FIG. 1, for showing one example of a method for solving the problem.

In FIG. 3, a structure is shown where the opening 111a of the bottom plate 111 shown in FIG. 2 has been closed.

In this case, even if the battery 30 is pivoted in the direction of arrow X in order to take the battery 30 from the battery chamber so that the battery rubber 12 receives a force acting in the direction of arrow Y, movement of the battery rubber 12 is blocked by the bottom plate 111 and the battery rubber 12 stays at its regular position so that such a problem can be prevented from occurring.

However, in order to mold a mold product having a structure shown in FIG. 3, it is necessary to produce a recess for accommodating the battery rubber 12 therein that is interposed between the bottom plate 111 and the rib 112b and such a mold structure requires that a portion of a mold for producing the recess should be slid upwardly in FIG. 3 before the mold is split, which results in increase in the number of manufacturing steps for manufacturing a mold. Further, when a mold product is manufactured using the mold, a step of sliding the portion of the mold is additionally required, which results in increase in the number of manufacturing steps. Furthermore, in design of a casing of the mobile phone, there occurs such a large constraint condition that an undercut 111b such as shown with a one-dotted chain line in FIG. 3 can not be provided at a portion corresponding to the sliding.

FIG. 4 is a view showing a portion corresponding to the interior of the circle R in FIG. 1 and showing another example for solving the problem.

In FIG. 4, a structure that the opening 111a of the bottom plate 111 shown in FIG. 2 has been closed is shown like the case shown in FIG. 3. Incidentally, in the case shown in FIG. 4, the rib 112b shown in FIG. 2 and FIG. 3 is not formed so that a face 12a of the battery rubber 12 on the side of the battery chamber opening is put in a uncovered state.

In order to mold a mold product shown in FIG. 4, a face of a bottom plate 111 on the side of the battery chamber including a portion formed with an opening 111a shown in FIG. 2 is formed by a mold split leftward in FIG. 4. With such a constitution, a mold product having a shape where the opening 111a shown in FIG. 2 has been closed can be molded, where such a sliding structure as shown in FIG. 3 is made unnecessary.

In the case shown in FIG. 4, however, since the face 12a of the battery rubber 12 on the side of the battery chamber opening is uncovered, a lower end edge 31 of a battery 30 collides against the face 12a, when a battery 30 is attached to/detached from the battery chamber. When the lower end edge 31 of the battery collides against the face 12a, a strong force acts on the battery rubber 12 in a lateral direction (in the direction of arrow Y), so that the battery rubber 12 may be peeled off even if the bottom plate 111 side has been closed.

In view of these circumstances, an object of the present invention is to provide a battery accommodating structure with a high reliability where a battery accommodated in a battery chamber is prevented from chattering and a mobile terminal provided with such a battery accommodating structure.

SUMMARY OF THE INVENTION

In order to achieve the object, according to an aspect of the present invention, there is provided a battery accommodating structure which is provided with a battery rubber receiving a lower end edge of a battery on a lower end side wall of a battery chamber with an opening defined by a bottom plate and side walls, where when a battery is inserted in the battery chamber, the lower end edge of the battery is pressed on the battery rubber, the battery is pivoted toward the bottom plate about the lower end edge of the battery serving as a pivoting axis and the battery is inserted in the battery chamber with the battery rubber compressed, so that the battery is accommodated in the battery chamber in a state that the lower end edge of the battery is pressed up by the battery rubber to prevent the battery from chattering, wherein the bottom plate has an opening at a portion thereof opposed to the battery rubber, and a battery rubber deviation preventing member that at least partially enters in the opening of the bottom plate to prevent the battery rubber from deviating toward the opening of the bottom plate is provided.

In the battery accommodating structure according to this aspect, for example, as shown in FIG. 1 and FIG. 2, the bottom plate of the battery chamber has the opening, and the battery rubber deviation preventing member that at least partially enters in the opening to prevent the battery rubber from deviating toward the opening of the bottom plate is provided, so that such a drawback that the battery rubber comes off from the battery chamber is prevented from occurring and a battery accommodating structure with a high reliability can be realized.

In the battery accommodating structure according to this aspect, the battery rubber may be attached to the lower end side wall formed integrally with the bottom plate by an adhesive double coated tape. Further, in the battery accommodating structure of the aspect, it is preferable that the lower end side wall has a rib covering a face of the battery rubber on the side of the opening of the battery chamber at such a position that battery rubber is positioned between the lower end side wall and the opening of the bottom plate.

According to another aspect of the present invention, in order to achieve the object, there is provided a mobile terminal that is inserted with a battery to perform communication with an external device by power from the battery, comprising a battery chamber with an opening having a recessed shape defined by a bottom plate and side walls and having a battery rubber receiving a lower end edge of the battery on a lower end side wall of the side walls, where when a battery is inserted in the battery chamber, the lower end edge of the battery is pressed on the battery rubber, the battery is pivoted toward the bottom plate about the lower end edge of the battery serving as a pivoting axis and the battery is inserted in the battery chamber with the battery rubber compressed, so that the battery is accommodated in the battery chamber in a state that the lower end edge of the battery is pressed up by the battery rubber to prevent the battery from chattering, wherein the bottom plate has an opening at a portion thereof opposed to the battery rubber, and a battery rubber deviation preventing member which at least partially enters in the opening of the bottom plate to prevent the battery rubber from deviating toward the opening of the bottom plate is provided.

In the mobile terminal of this aspect, the battery rubber may be attached to the lower end side wall formed integrally with the bottom plate by an adhesive double coated tape. Further, it is preferable that the lower end side wall has a rib covering a face of the battery rubber on the side of the opening of the battery chamber at such a position that the battery rubber is positioned between the lower end side wall and the opening of the bottom plate.

As explained above, according to this invention, chattering of a battery accommodated in a battery chamber is securely prevented with a high reliability.

DESCRIPTION OF THE PREFERRED EMBODIMENT

Figure 1:
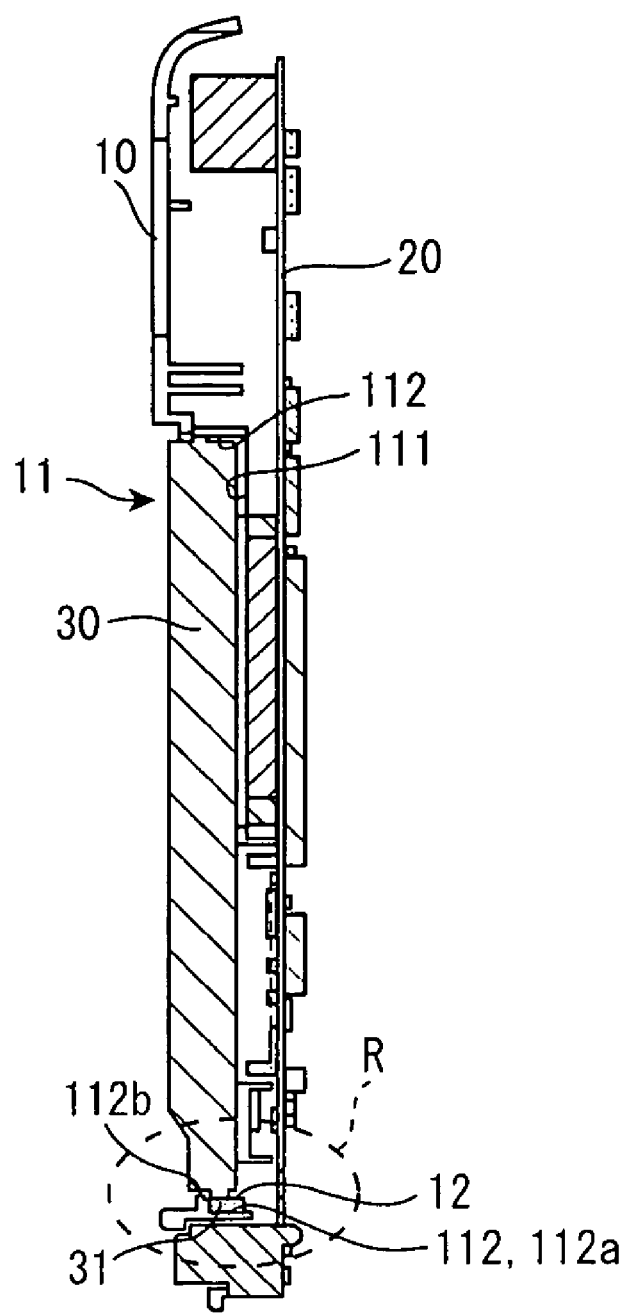
FIG. 1 is a view showing one example of a battery accommodating structure in a mobile phone.

An embodiment of the invention will be explained below with reference to the drawings.

In explanation, sections corresponding to respective sections in FIG. 1 and FIG. 2 described above are denoted by the same reference numerals as those used in FIG. 1 and FIG. 2, and differences between the embodiment and the conventional battery accommodating structure will be explained principally.

Figure 5:
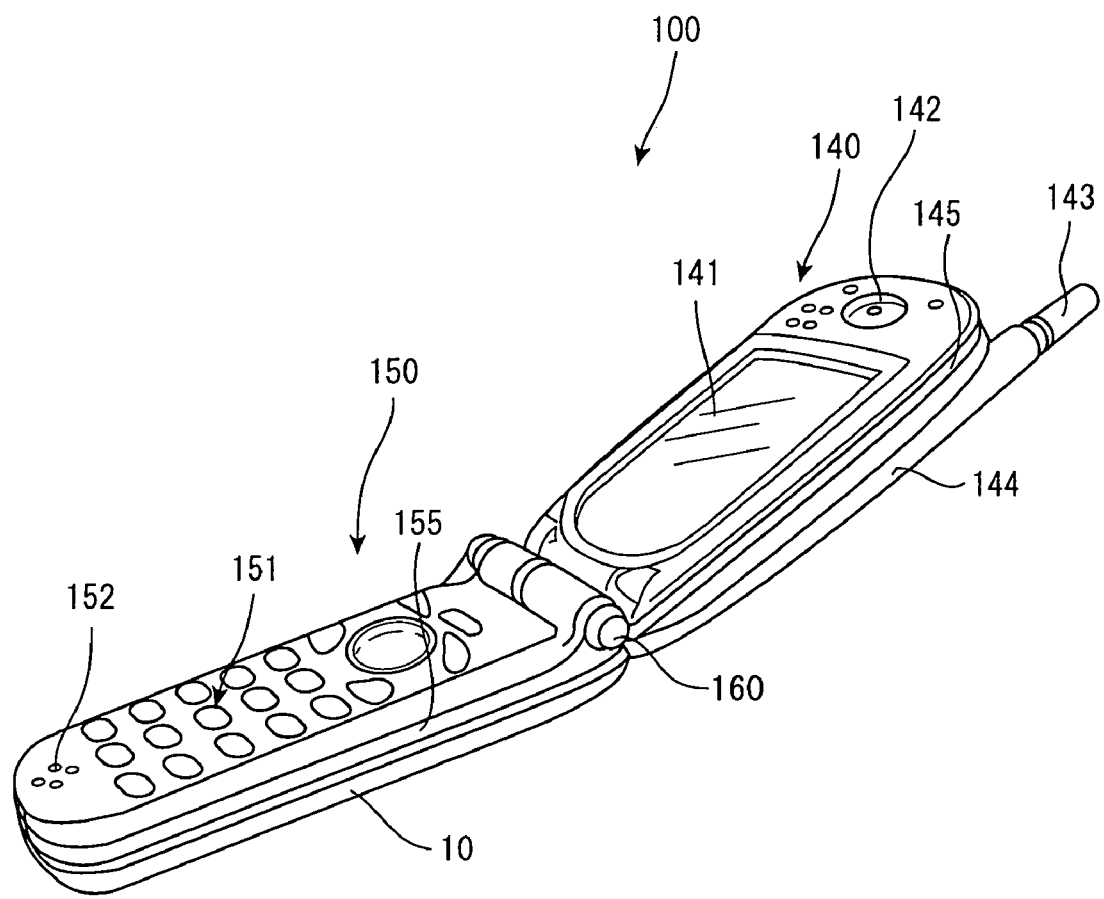
FIG. 5 is a perspective appearance view of a mobile phone, which is one embodiment of a mobile phone of the present invention, having a battery accommodating structure as one embodiment of the present invention.

FIG. 5 is a perspective appearance view of a mobile phone, which is one embodiment of a mobile phone of the present invention, having a battery accommodating structure according to one embodiment of the present invention. A mobile phone 100 is a mobile phone of a folding type where an upper portion 140 assembled with a display screen 141, an earpiece 142, an antenna 143 and the like, and a lower portion 150 formed with a key operation panel 151, a mouthpiece 152 and the like are connected to each other via a hinge 160 in an openable/closable manner. A lower portion 150 of the mobile phone 100 has a structure obtained by stacking a back side mold product 10 and a front side mold product 155 to each other, and a circuit board on which various circuit parts are mounted, a microphone positioned so as to correspond to the mouthpiece 152, and the like are assembled between the both mold products 10 and 155.

The upper portion 140 of the mobile phone 100 also has a structure obtained by stacking a back face side mold product 144 and a front side mold product 145 to each other, and various contents are accommodated between the two mold products 144 and 145. A feature portion of the embodiment lies in the back face side mold product 10 constituting the lower portion 150 of the mobile phone 100 shown in FIG. 5. The mold product will be mainly described in the following explanation.

Figure 6:
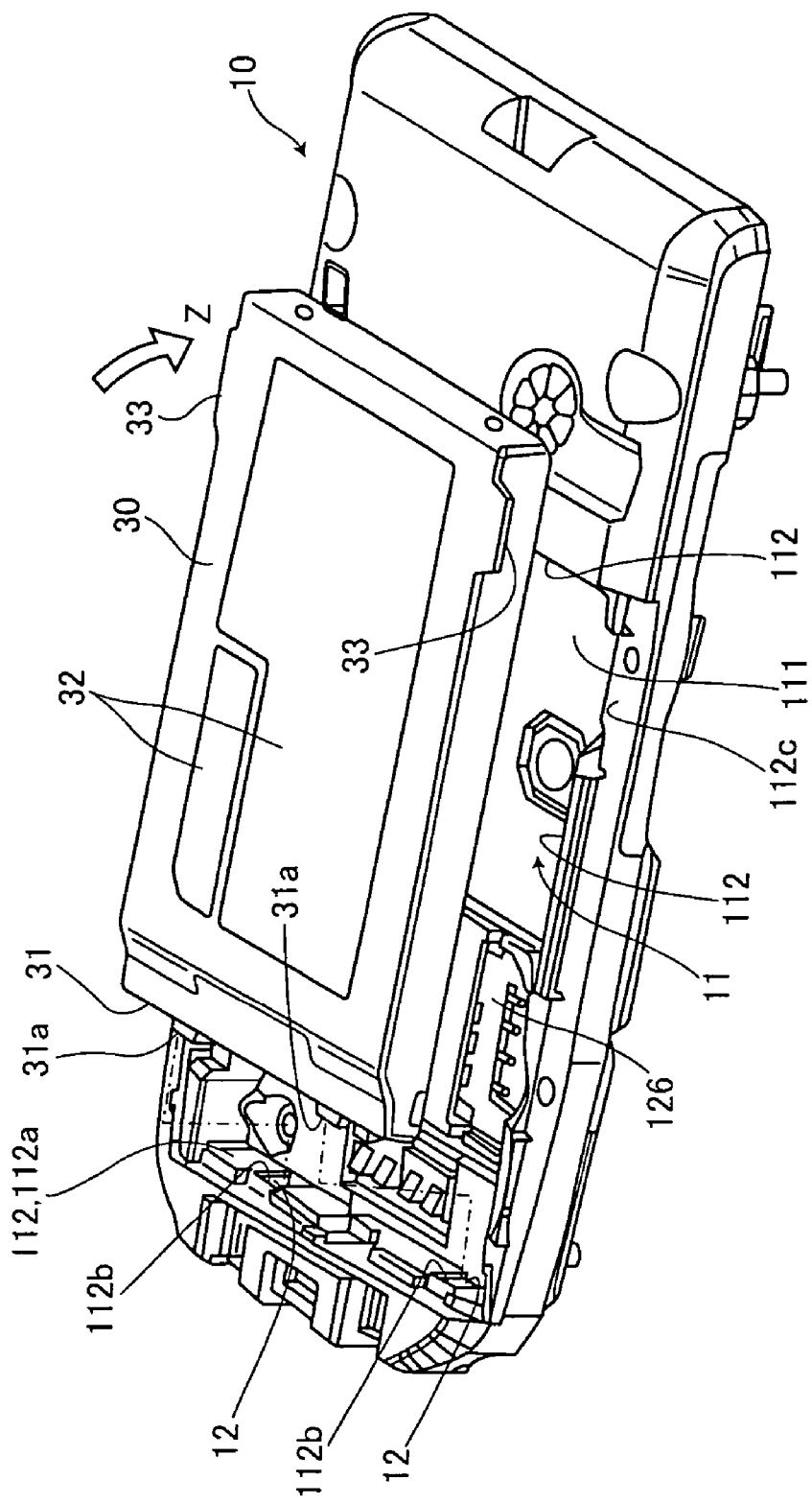
FIG. 6 is a perspective view of a rear face mold product constituting a lower portion of a mobile phone shown in FIG. 5 which is viewed obliquely from a rear face side of the mobile phone shown in FIG. 5.

FIG. 6 is a perspective view of the rear face side mold product 10 constituting a lower portion 110 of the mobile phone 100 shown in FIG. 5, viewed obliquely from a back face side of the mobile phone shown in FIG. 5. The mold product 10 shown in FIG. 6 is assembled with various constituent parts including, for example, a medium mounting section 126 on which a recording medium is mounted and the like. Hereinafter, the feature portion of the embodiment will be mainly explained and some of the other portions may be omitted.

The mold product 10 is provided with a battery chamber 11 with an opening formed on an upper portion in FIG. 6, that is defined by a bottom plate 111 and side walls 112 formed so as to surround the bottom plate 111. Two battery rubbers 12 are respectively disposed at two positions on a lower end side wall 112a of the side walls 112 defining the battery chamber 11, and ribs 112b closing a face of the battery rubbers 12 positioned on the side of the battery chamber opening are formed on the lower end side wall 112a.

On the other hand, a label 32 is attached on the battery 30, and two projections 31a are formed at positions corresponding to the two battery rubbers 12 arranged on the battery chamber 11 on the lower end edge 31 of the battery 30.

When the battery 30 is inserted in the battery chamber 11, the projections 31a provided on the lower end edge 31 of the battery 30 are pushed on the battery rubbers 12 at the lower end of the battery chamber and the battery 30 is pivoted in a direction of arrow Z utilizing the projections 31a as a pivoting center. Thereby, the battery 30 is inserted in the battery chamber 11 and it is prevented from chattering owing to the fact that the battery is pressed by the battery rubbers 12.

Figure 7:
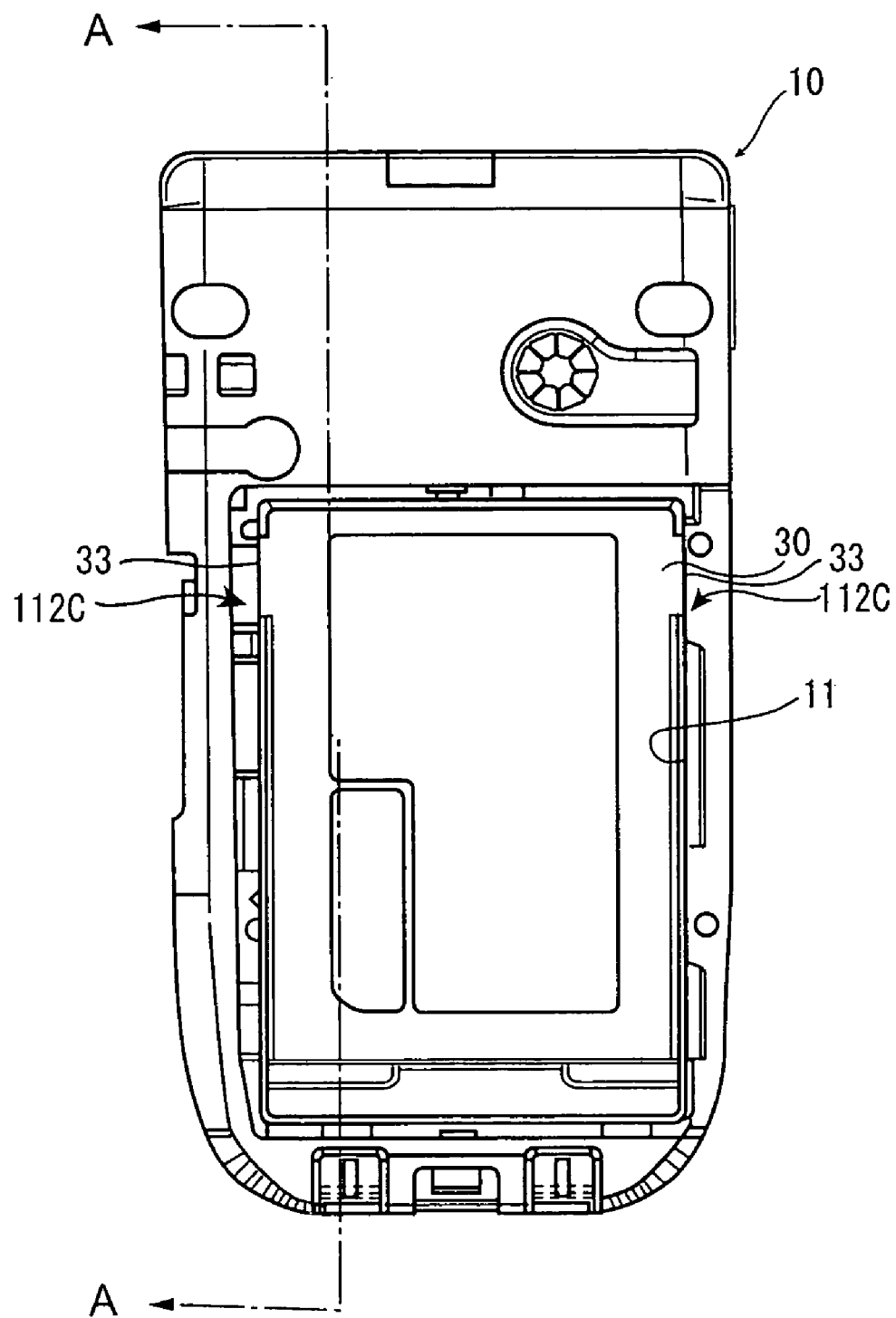
FIG. 7 is a back view of the mold product shown in FIG. 6.
Figure 8:
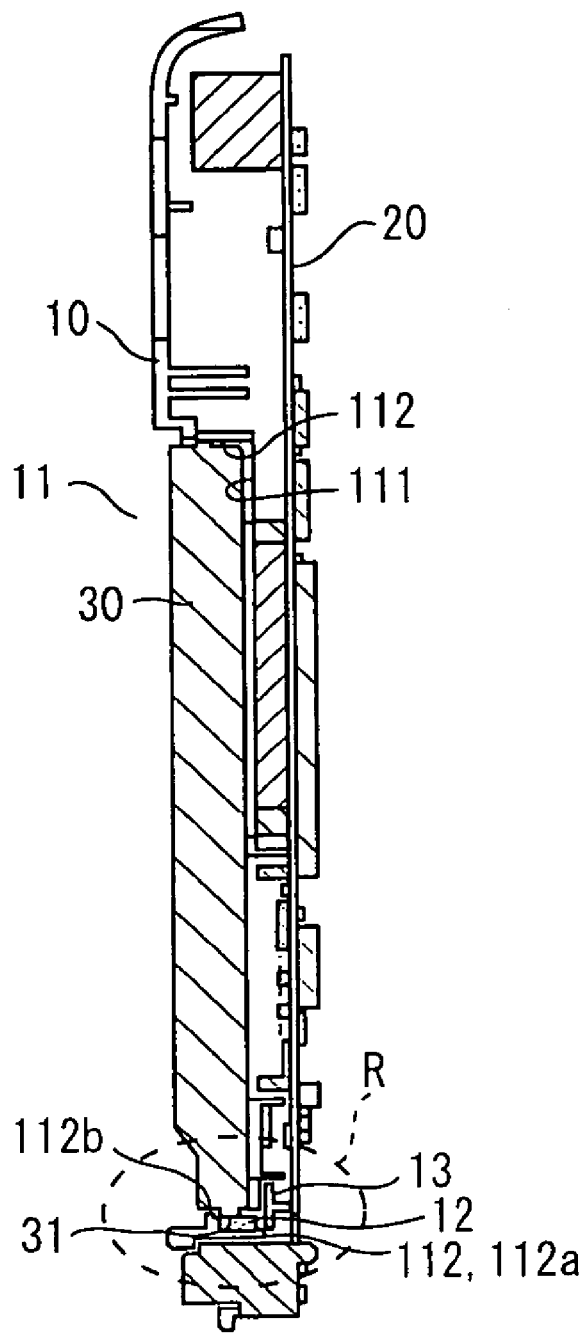
FIG. 8 is a sectional view of the mold product, taken along arrow A-A in FIG. 7.
Figure 9:
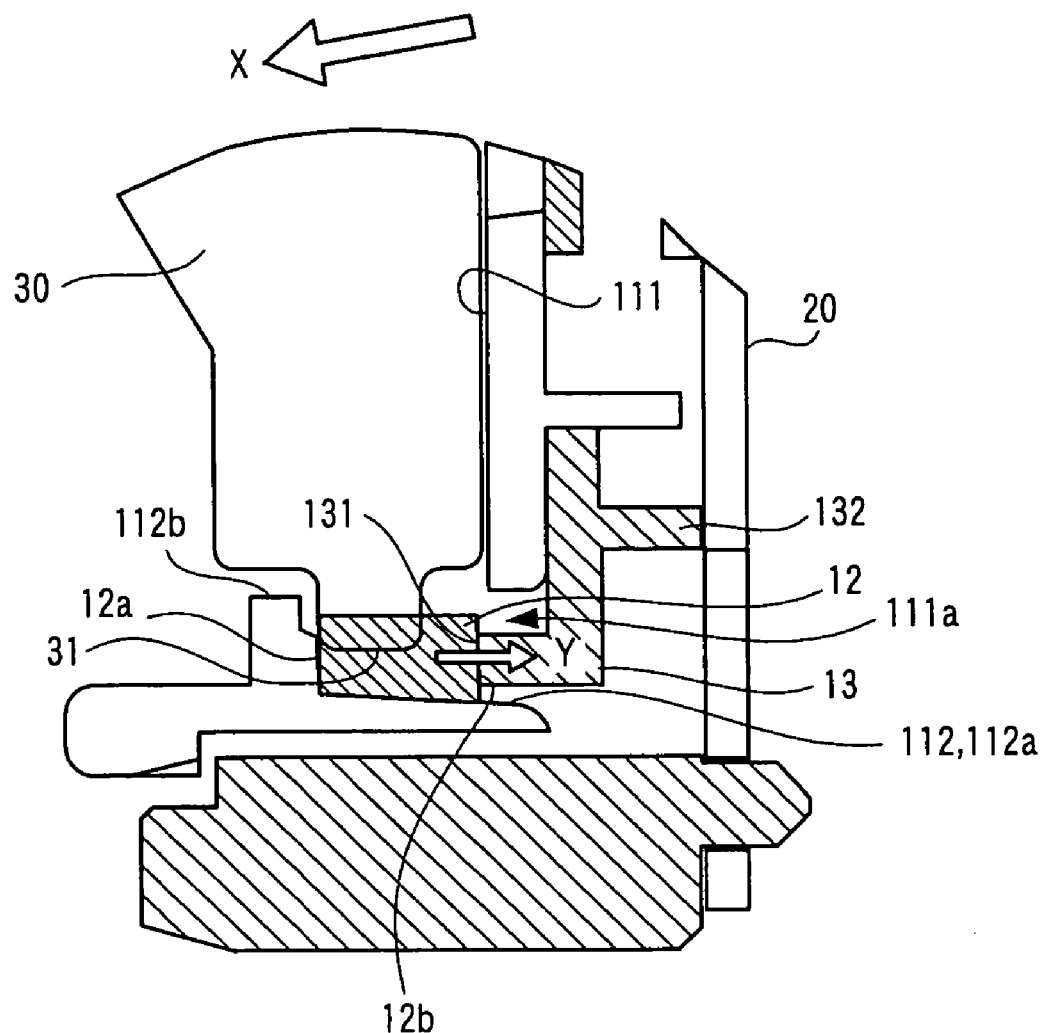
FIG. 9 is an enlarged view of a partial structure indicated by a circle R in FIG. 8.

FIG. 7 is a back view of the mold product 10 shown in FIG. 6, FIG. 8 is a sectional view of the mold product 10, taken along arrow A-A in FIG. 7, and FIG. 9 is an enlarged view of a partial structure of the inside of a circle R shown in FIG. 8.

FIG. 7 shows a state where a battery 30 has been inserted into a battery chamber 11.

Portions 112c each having a shape where an upper portion of the side wall 112 also shown in FIG. 6 has been cut off are provided on both upper sides of the battery chamber 11, while finger catching sections 33 projecting laterally are formed at positions corresponding to the portions 112c on the battery 30. The battery 30 which has been inserted in the battery chamber 11 is detached from the battery chamber 11 in the following manner. A mobile phone user catches the finger catching sections 33 of the battery 30 by his/her fingers and pivots the battery 30 about the lower end edge 31 of the battery 30 in a direction in which the battery 30 is detached from the battery chamber 11 to take an upper portion of the battery 30 out of the battery chamber 11. Thereafter, the mobile phone user performs a battery taking-out operation from the battery chamber 11 regarding the lower end side of the battery 30.

Figure 2:
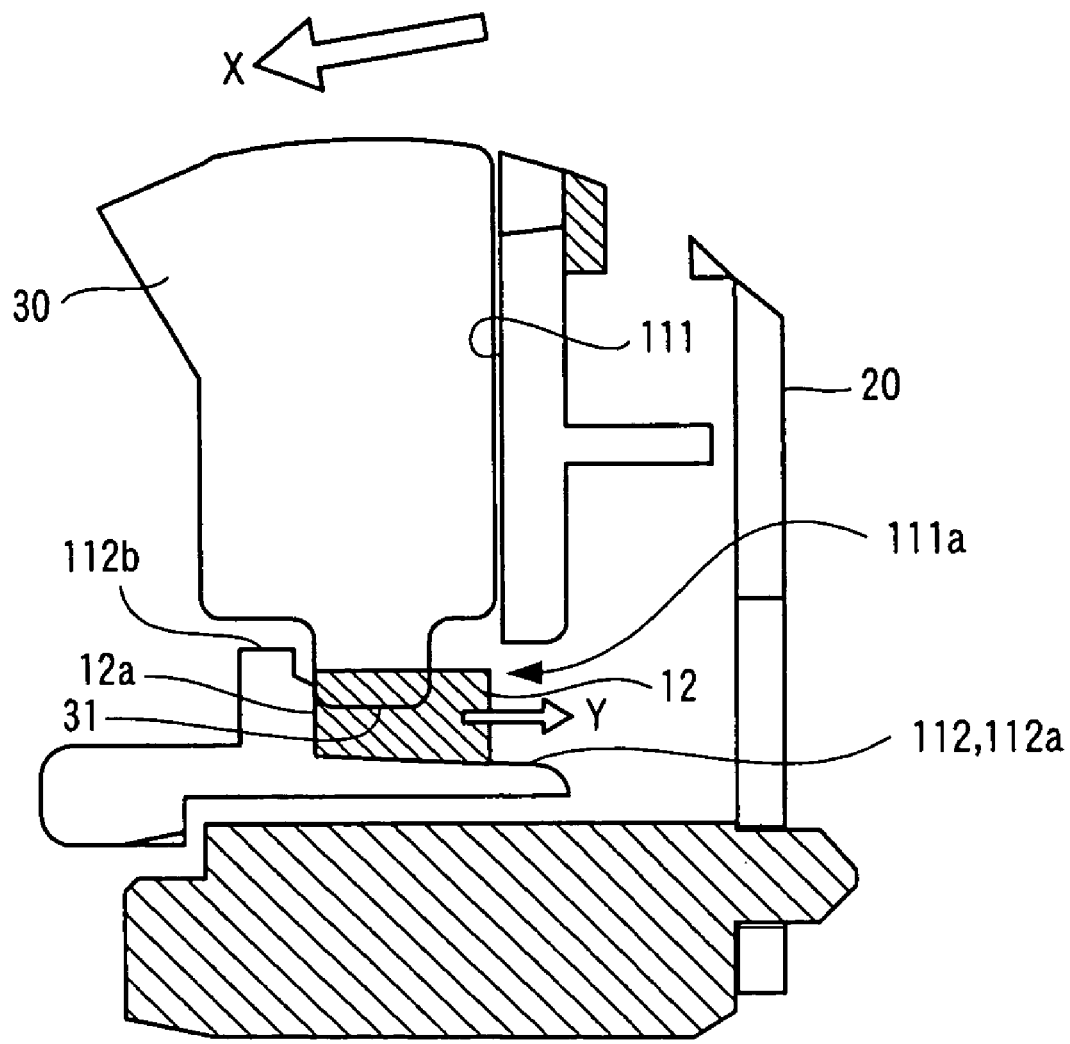
FIG. 2 is an enlarged view of a portion of the battery accommodating structure surrounded by a circle R in FIG. 1.
Figure 3:
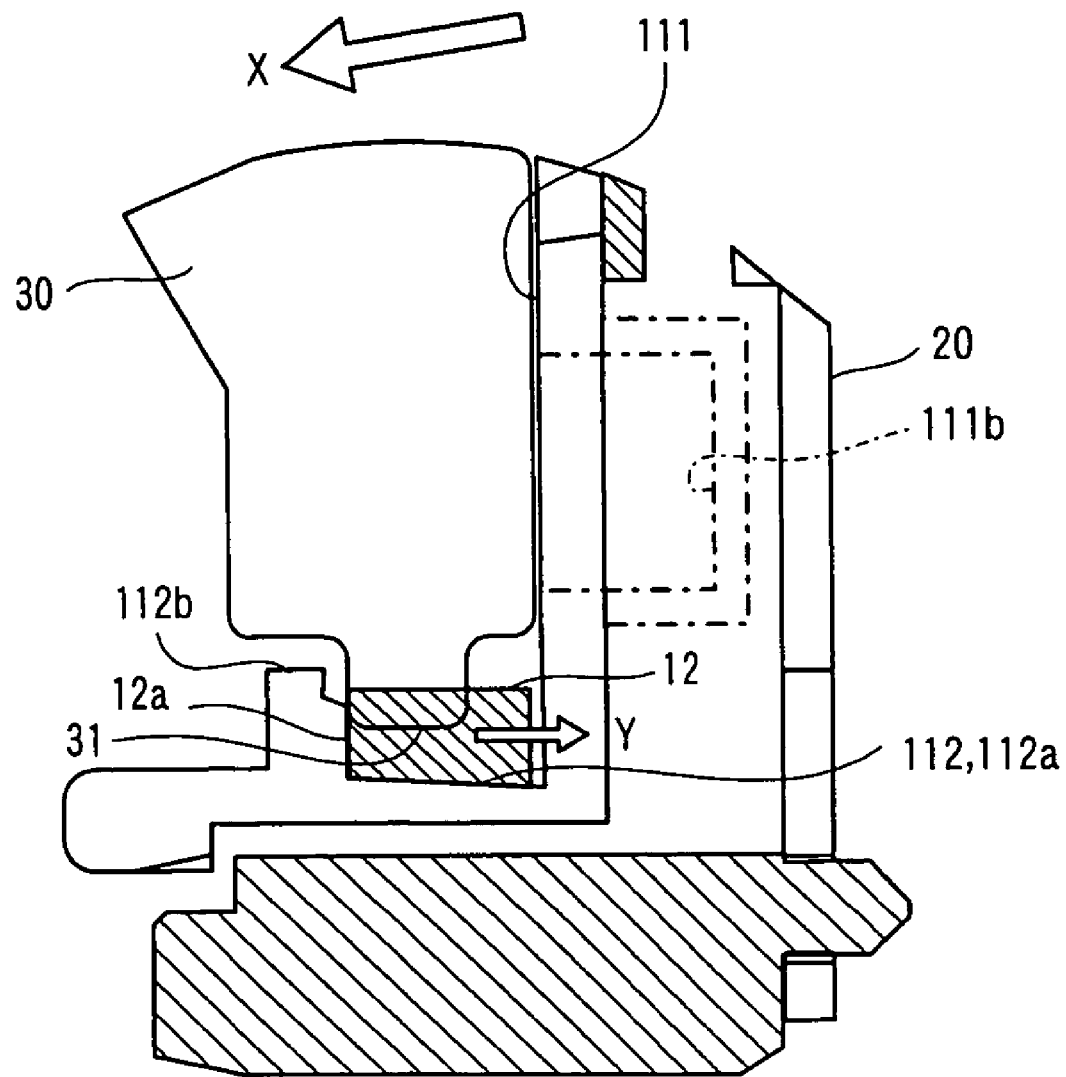
FIG. 3 is an enlarged view showing a portion corresponding to the inside of the circle R in FIG. 1, for showing one solution of a problem.
Figure 4:
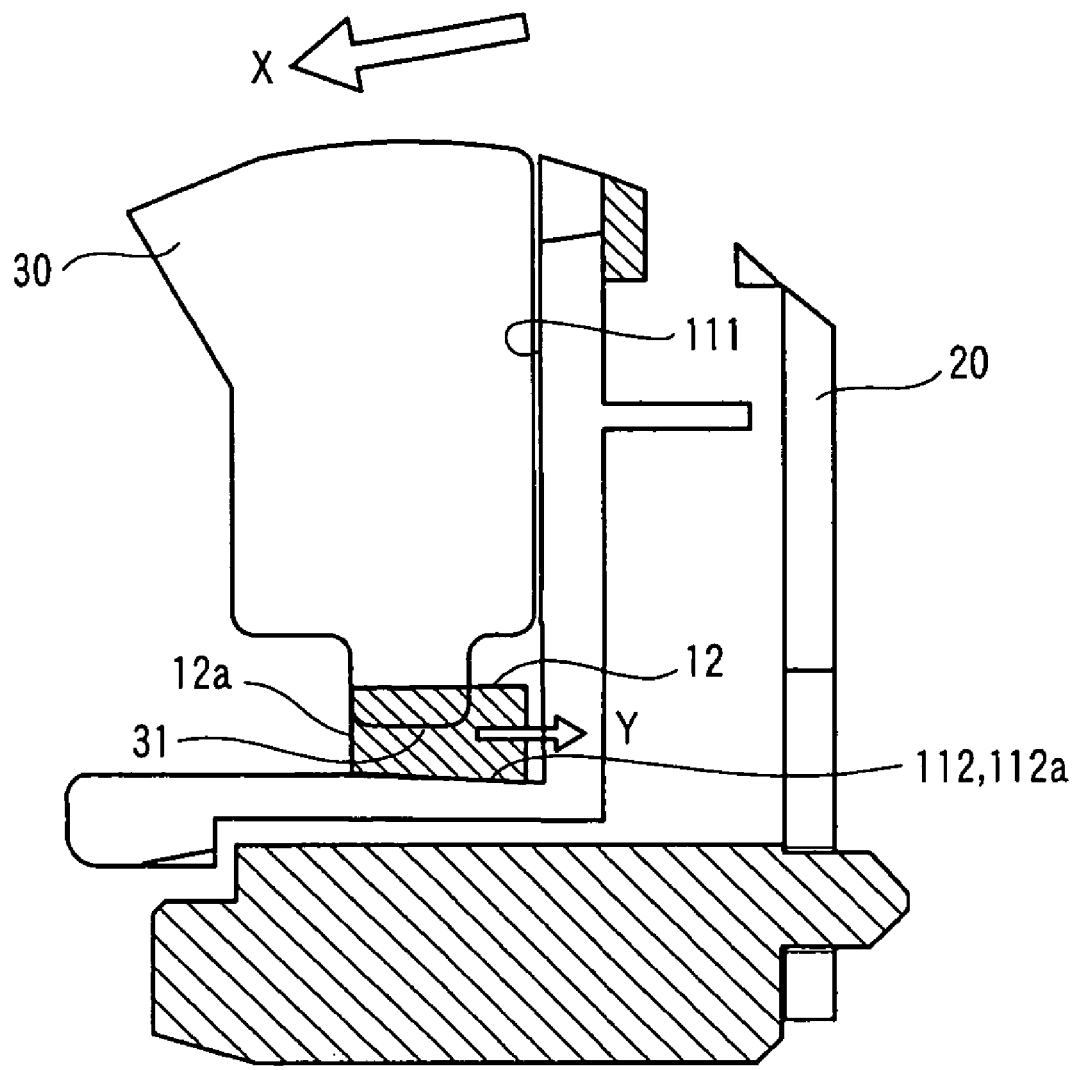
FIG. 4 is a view showing the portion corresponding to the inside of the circle R in FIG. 1, for showing another solution of the problem.

FIG. 8 and FIG. 9 are views corresponding to FIG. 1 and FIG. 2, respectively, and a structure shown in FIG. 8 and FIG. 9 is different from that shown in FIG. 1 and FIG. 2 in that the former structure is provided with a battery rubber deviation or slippage preventing member 13. The battery rubber deviation preventing member 13 has a battery rubber pressing portion 131 that partially enters in an opening 111a provided with the bottom plate 111 which defines the battery chamber to press a face 12b of the battery rubber 12 on the side of the bottom plate. The battery rubber deviation preventing member 13 is adhered to a back face of the bottom plate 111 with an adhesive double coated tape (not shown) and has an arm 132 extending toward a circuit board 20. Therefore, if the battery 30 inserted in the battery chamber is pivoted in the direction of arrow X so that a force in the direction of arrow Y acts on the battery rubber 12, the battery rubber 12 abuts on the battery rubber pressing portion 131 of the battery rubber deviation preventing member 13. Since deviation of the position of the battery rubber deviation preventing member 13 itself is prevented owing to adhesion to the bottom plate 111 and abutment of the arm 132 on the circuit board 20, even if the battery rubber 12 receives a force in the direction of arrow Y from the battery rubber pressing portion 131 of the battery rubber deviation preventing member 13, the battery rubber 12 is prevented from deviating. Accordingly, when the battery 30 is inserted in the battery chamber 11, the battery rubber 12 securely serves such that the inserted battery 30 is prevented from chattering and electrical conduction between the battery and the mobile phone is reliably maintained.

In addition, a mold that molds the mold product may be a mold that is simply split in left and right-directions in FIG. 8 and FIG. 9 like the case shown in FIG. 1 and FIG. 2, where a sliding structure is not required.

Here, such a fact that the battery rubber deviation preventing member 13 is adhered to the bottom plate 111 with an adhesive double coated tape has been explained. However, for example, the battery rubber deviation preventing member 13 may be screwed to the bottom plate 111, or any fixing member or fastener which fixes the battery rubber deviation preventing member 13 maybe used. The shape of the battery rubber deviation preventing member 13 is not limited to the shape shown in FIG. 8 and FIG. 9, but the member 13 may have a shape where it enters in the opening 111*a* at least partially to prevent the battery rubber 12 from deviating in the direction of arrow Y.

Though the mobile phone has been herein explained as the example here, it is not that the present invention is applicable only to the mobile phone. For example, the present invention is also applicable to any portable or mobile terminal that is inserted with a battery and has a function that perform communication with an external device or equipment by power from the battery. More broadly, the present invention can be applied to any equipment in which a battery is inserted to operate due to power from the battery.

What is claimed is:

1. A battery accommodating structure which is provided with a battery rubber receiving a lower end edge of a battery on a lower end side wall of a battery chamber with an opening defined by a bottom plate and side walls, where when a battery is inserted in the battery chamber, the lower end edge of the battery is pressed on the battery rubber, the battery is pivoted toward the bottom plate about the lower end edge of the battery serving as a pivoting axis and the battery is inserted in the battery chamber with the battery rubber compressed, so that the battery is accommodated in the battery chamber in a state that the lower end edge of the battery is pressed up by the battery rubber to prevent the battery from chattering, wherein the bottom plate has an opening at a portion thereof opposed to the battery rubber, and a battery rubber deviation preventing member that at least partially enters in the opening of the bottom plate to prevent the battery rubber from deviating toward the opening of the bottom plate is provided.

2. A battery accommodating structure according to claim 1, wherein the battery rubber is adhered to the lower end side wall formed integrally with the bottom plate by an adhesive both coated tape.

3. A battery accommodating structure according to claim 1, wherein the lower end side wall has a rib covering a face of the battery rubber on the side of the opening of the battery chamber at such a position that the battery rubber is interposed between the lower end side wall and the opening of the bottom wall.

4. A mobile terminal that is inserted with a battery to perform communication with an external device by power from the battery, comprising a battery chamber with an opening having a recessed shape defined by a bottom plate and side walls and having a battery rubber receiving a lower end edge of the battery on a lower end side wall of the side walls, where when a battery is inserted in the battery chamber, the lower end edge of the battery is pressed on the battery rubber, the battery is pivoted toward the bottom plate about the lower end edge of the battery serving as a pivoting axis and the battery is inserted in the battery chamber with the battery rubber compressed, so that the battery is accommodated in the battery chamber in a state that the lower end edge of the battery is pressed up by the battery rubber to prevent the battery from chattering, wherein the bottom plate has an opening at a portion thereof opposed to the battery rubber, and a battery rubber deviation preventing member which at least partially enters in the opening of the bottom plate to prevent the battery rubber from deviating toward the opening of the bottom plate is provided.

* * * * *